(12) United States Patent
Miyasaka (10) Patent No.: US 9,637,167 B2
(45) Date of Patent: May 2, 2017

(54) STEERING CONTROL DEVICE, AND STEERING CONTROL METHOD

(71) Applicant: NISSAN MOTOR CO., LTD., Yokohama-shi, Kanagawa (JP)

(72) Inventor: Shogo Miyasaka, Zama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 27 days.

(21) Appl. No.: 14/432,933

(22) PCT Filed: Sep. 30, 2013

(86) PCT No.: PCT/JP2013/005809
§ 371 (c)(1),
(2) Date: Apr. 1, 2015

(87) PCT Pub. No.: WO2014/054265
PCT Pub. Date: Apr. 10, 2014

(65) Prior Publication Data
US 2015/0291208 A1    Oct. 15, 2015

(30) Foreign Application Priority Data
Oct. 3, 2012    (JP) .................................. 2012-221308

(51) Int. Cl.
*B62D 5/04*    (2006.01)
*B62D 5/00*    (2006.01)
*B62D 6/10*    (2006.01)

(52) U.S. Cl.
CPC .......... *B62D 5/0484* (2013.01); *B62D 5/003* (2013.01); *B62D 5/043* (2013.01); *B62D 5/046* (2013.01);
(Continued)

(58) Field of Classification Search
CPC .... B62D 5/043; B62D 5/0433; B62D 5/0439; B62D 5/0475; B62D 5/0478; B62D 5/046
See application file for complete search history.

(56) References Cited

U.S. PATENT DOCUMENTS

| | | | | |
|---|---|---|---|---|
| 4,741,409 A | * | 5/1988 | Westercamp | B62D 5/001 180/413 |
| 6,929,090 B2 | * | 8/2005 | Furumi | B62D 5/046 701/43 |

(Continued)

FOREIGN PATENT DOCUMENTS

| JP | 2002225733 A | 8/2002 |
|---|---|---|
| JP | 2004345412 A | 12/2004 |

(Continued)

OTHER PUBLICATIONS

Espacenet Translation of JP 2009 262609, Morishima et al, 15 pages, Nov. 12, 2009.*

*Primary Examiner* — Dale W Hilgendorf
(74) *Attorney, Agent, or Firm* — Young Basile Hanlon & MacFarlane, P.C.

(57) ABSTRACT

To achieve a fail-safe fully utilizing the advantage of plural motors, a second controller performs a one-motor SBW mode when at least one of a first turning controller, a first turning motor and a torque sensor malfunctions in a state where the first turning controller and the second turning controller perform a two-motor SBW mode. Furthermore, the first controller performs a one-motor EPS mode when at least one of the second turning controller and the second turning motor malfunctions in the state where the first turning controller and the second turning controller perform a two-motor SBW mode.

10 Claims, 2 Drawing Sheets

(52) U.S. Cl.
CPC ......... *B62D 5/0433* (2013.01); *B62D 5/0439* (2013.01); *B62D 5/0475* (2013.01); *B62D 5/0478* (2013.01); *B62D 6/10* (2013.01)

(56) References Cited

U.S. PATENT DOCUMENTS

| | | | | |
|---|---|---|---|---|
| 7,500,537 | B2* | 3/2009 | Itoh | B62D 5/003 180/402 |
| 7,690,475 | B2* | 4/2010 | Tsutsumi | B62D 5/0478 180/402 |
| 2001/0032762 | A1* | 10/2001 | Weisgerber | B62D 5/001 180/417 |
| 2005/0257992 | A1* | 11/2005 | Shiino | B62D 5/04 180/444 |
| 2006/0278466 | A1* | 12/2006 | Cheng | B62D 5/04 180/444 |
| 2010/0147618 | A1* | 6/2010 | Osonoi | B62D 5/001 180/403 |

FOREIGN PATENT DOCUMENTS

| | | | |
|---|---|---|---|
| JP | 2007069848 A | | 3/2007 |
| JP | 2009262609 A | * | 11/2009 |
| JP | 2010137745 A | | 6/2010 |

* cited by examiner

| | DIAGNOSIS RESULT | | | | | | | |
|---|---|---|---|---|---|---|---|---|
| TURNING ECU 1 (WITH TORQUE SENSOR) | ○ | × | ○ | ○ | ○ | × | × | × |
| TURNING ECU 2 (WITHOUT TORQUE SENSOR) | ○ | ○ | × | ○ | × | × | ○ | × |
| REACTION FORCE ECU | ○ | ○ | ○ | × | × | ○ | × | × |
| MODE | 2M-SBW (2M-EPS) | 1M-SBW | 1M-EPS | | | MS | | |

FIG. 3

STEERING CONTROL DEVICE, AND STEERING CONTROL METHOD

CROSS REFERENCE TO RELATED APPLICATION

The present application claims priority to Japanese Patent Application No. 2012-221308, filed Oct. 3, 2012, incorporated herein in its entirety.

TECHNICAL FIELD

This disclosure relates to a steering control device and a steering control method.

BACKGROUND

JP 2002-225733 A describes a steering-by-wire in which wheels are turned by one motor for steering. When the motor for steering malfunctions, a backup clutch is connected to mechanically couple a steering system. When turning by one motor in this way, the size of the motor increases to obtain a sufficient power, and thus the degree of freedom of the layout thereof are reduced. Therefore, it has been discussed to turn the wheels by two smaller motors.

The configuration in which the two motors turn the wheels is capable of suppressing the increasing in the size of the motor and is excellent in layout characteristics. However, there is a room for consideration about a fail-safe. For example, the backup clutch may be connected when any one of the motors malfunctions. However, this makes the other motor which does not malfunction unusable. Thus, the advantage of the provision of two motors is not fully utilized.

SUMMARY

One object of an embodiment of the present invention is to achieve a fail-safe capable of fully utilizing the advantage of the provision of plural motors.

According to an aspect of the present disclosure, there is provided a steering control device including a clutch provided between a steering input mechanism and a turning output mechanism, a first motor and a second motor configured to provide driving force provided in the turning output mechanism, and a torque detection unit provided for an output shaft. Then, two-motor turning control is defined as performing control of a turning angle of a wheel by controlling a rotation angle of the first motor by a first control unit and by controlling a rotation angle of the second motor by a second control unit, depending on a rotation angle of an input shaft in a state where the clutch is disconnected. Furthermore, one-motor turning control is defined as performing the control of the turning angle of the wheel by controlling the rotation angle of the second motor by the second control unit, depending on the rotation angle of the input shaft in a state where the clutch is disconnected and the first control unit does not control the driving of the first motor. Furthermore, one-motor assist control is defined as performing control of an assist torque for a steering operation by a driver by controlling a torque of the first motor by the first control unit depending on a torque detected by the torque detection unit in a state where the clutch is connected and the second control unit does not control the driving of the second motor. Then, the second control unit is configured to perform the one-motor turning control when at least one of the first control unit, the first motor, and the torque detection unit malfunctions in a state where the first control unit and the second control unit performs the two-motor turning control. Furthermore, the first control unit is configured to perform the one-motor assist control when at least one of the second control unit and the second motor malfunctions in the state where the first control unit and the second control unit performs the two-motor turning control.

DESCRIPTION OF THE EMBODIMENTS

Hereinafter, embodiments of the present invention will now be described with reference to the drawings.

First Embodiment

Figure 1:
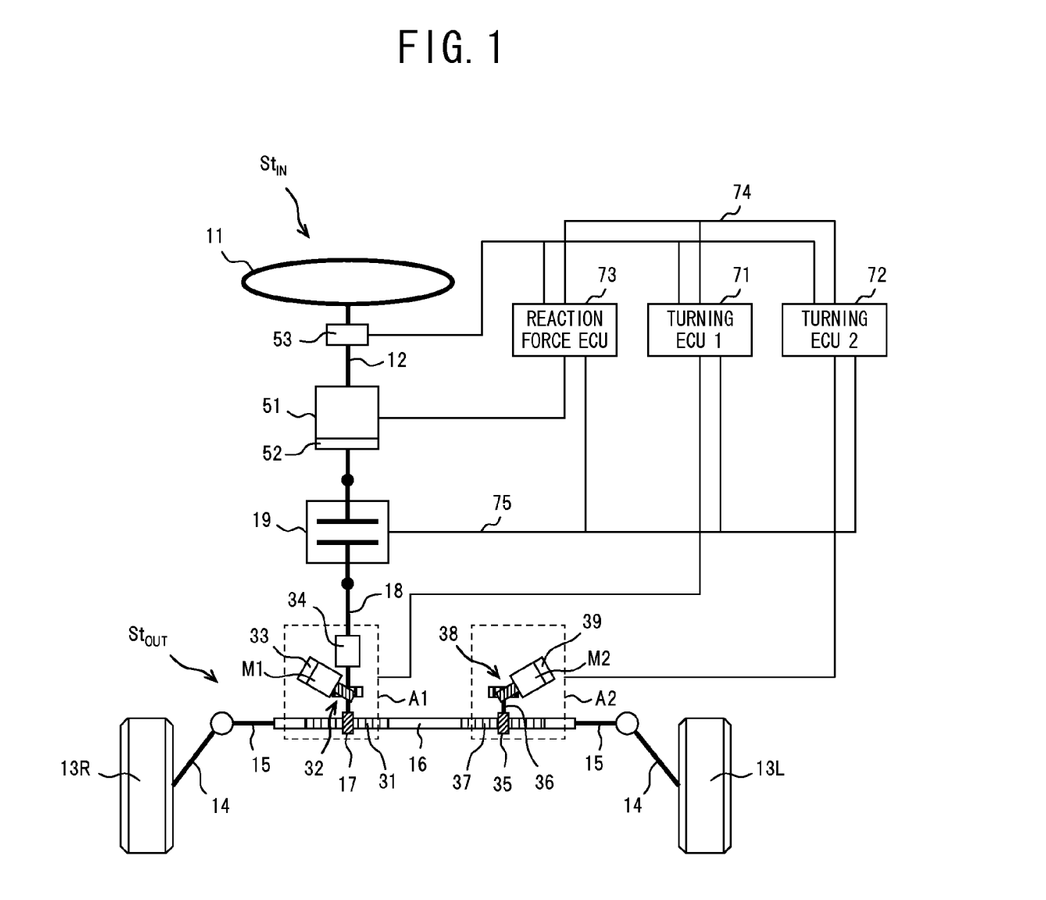
FIG. 1 is a configuration diagram of a steering apparatus.

First, the configuration of a steering apparatus will be described. FIG. 1 is a configuration diagram of the steering apparatus. A steering wheel 11 is coupled to a steering shaft 12. Wheels (turning wheels) 13L and 13R are coupled to a first pinion shaft 18 via a knuckle arms 14, tie rods 15, a rack shaft 16, and a pinion gear 17, in this order. The steering shaft 12 and the first pinion shaft 18 are coupled to each other via a clutch 19 in a switchable manner such that they can be connected or disconnected.

In this configuration, the steering wheel 11 and the steering shaft 12 which exist on the input side of the clutch 19 are a steering input mechanism $St_{IN}$ in which the steering shaft 12 is rotated by a steering operation by a driver. Furthermore, the knuckle arms 14, the tie rods 15, the rack shaft 16, the pinion gear 17, and the first pinion shaft 18 exist on the output side of the clutch 19 are a turning output mechanism $St_{OUT}$ configured to turn the wheels 13L and 13R by the rotation of the first pinion shaft 18.

Therefore, in a state where the clutch 19 is connected (engaged), when rotating the steering wheel 11, the steering shaft 12, the clutch 19, and the first pinion shaft 18 rotate. A rotational movement of the first pinion shaft 18 is converted into a back-and-forth movement of the tie rods 15 by the rack shaft 16 and the pinion gear 17, the back-and-forth movement turns the wheels 13L and 13R via the knuckle arms 14.

The clutch 19 includes an electromagnetic clutch of non-excitation-engaging type. That is, when an electromagnetic coil is not excited, a roller meshes between a cam surface of the input shaft and an outer ring of the output shaft by, for example, a cam roller mechanism, to engage the input shaft to the output shaft. On the other hand, when the electromagnetic coil is excited, the meshing of the roller between the cam surface of the input shaft and the outer ring of the output shaft is released by attraction of the armature. The input shaft and the output shaft are disconnected.

The rack shaft 16 extends in a vehicle body transverse direction (vehicle width direction), and a rack gear (teeth) 31 is formed on one side of the rack shaft (in this example, a right side of the vehicle body). A pinion gear 17 meshes the rack gear 31. The state of meshing of the rack gear 31 and the pinion gear 17 is adjusted by a retainer mechanism.

The first pinion shaft 18 includes the input shaft on the clutch side and the output shaft on the pinion gear side. The output shaft is coupled to the first turning motor M1 via, for example, a worm gear 32. A resolver 33 detecting a motor rotation angle is provided on the first turning motor M1.

The worm gear 32 includes a worm wheel coupled to the first pinion shaft 18 and a worm coupled to the first turning motor M1. A worm shaft obliquely crosses a worm wheel shaft. This is for downsizing a module in a perpendicular direction to the first pinion shaft 18. In the worm gear 32, a twist angle of the worm is set to be larger than a repose angle (friction angle) such that the worm wheel can be rotated by the rotation of the worm and the worm can be rotated by the rotation of the worm wheel, that is, can be reversely driven.

A torque sensor 34 is provided between the input shaft and the output shaft of the first pinion shaft 18. The pinion gear 17, the output shaft of the first pinion shaft 18, the worm gear 32, the first turning motor M1, the resolver 33, and the torque sensor 34 are configured as an integrated composite component (assembly). This is referred to as the first actuator A1. The first actuator A1 is used in common as components of an electric power steering apparatus.

According to the first actuator A1, when the first turning motor M1 is driven in a state the clutch 19 is disconnected, the first pinion shaft 18 is rotated via the worm gear 32. Therefore, the turning angle of the wheels 13L and 13R varies depending on the rotation angle of the first turning motor M1. Therefore, by controlling the driving of the first turning motor M1 depending on the steering operation by the driver when the clutch 19 is disconnect, desired steering control characteristics as a steering-by-wire function are achieved.

Furthermore, when the first turning motor M1 is driven in a state the clutch 19 is connected, a motor torque is transmitted to the first pinion shaft 18 via the worm gear 32. Therefore, by controlling the driving of the first turning motor M1 depending on the steering operation by the driver when the clutch 19 is connect, desired assist characteristics reducing the operation burden of the driver are achieved.

The second pinion shaft 36 is coupled to the other side of the rack shaft 16 (in this example, a left side of the vehicle body) via a pinion gear 35. That is, the rack gear (teeth) 37 is formed on the other side of the rack shaft 16 (in this example, a left side of the vehicle body). The pinion gear 35 meshes the rack gear 37. The state of meshing of the rack gear 37 and the pinion gear 35 is adjusted by a retainer mechanism.

The second turning motor M2 is coupled to the second pinion shaft 36 via, for example, a worm gear 38. The second turning motor M2 is the same type of the motor as the first turning motor M1. A resolver 39 detecting a motor rotation angle is provided on the second turning motor M2. The worm gear 38 includes a worm wheel coupled to the second pinion shaft 36 and a worm coupled to the second turning motor M2. A worm shaft obliquely crosses a worm wheel shaft. This is for downsizing a module in a perpendicular direction to the second pinion shaft 36. In the worm gear 38, a twist angle of the worm is set to be larger than a repose angle (friction angle) such that the worm wheel can be rotated by the rotation of the worm and the worm can be rotated by the rotation of the worm wheel, that is, can be reversely driven.

The pinion gear 35, the output shaft of the second pinion shaft 36, the worm gear 38, the second turning motor M2, and the resolver 39 are configured as an integrated composite component (assembly). This is referred to as the second actuator A2. According to the second actuator A2, when the second turning motor M2 is driven in a state the clutch 19 is disconnected, the second pinion shaft 36 is rotated via the worm gear 38. Therefore, the turning angle of the wheels 13L and 13R varies depending on the rotation angle of the second turning motor M2. Therefore, by controlling the driving of the second turning motor M2 depending on the steering operation by the driver when the clutch 19 is disconnect, desired steering control characteristics as the steering-by-wire function are achieved.

A reaction force motor 51 is coupled to the steering shaft 12. The reaction force motor 51 includes a rotor rotating with the steering shaft 12, and a stator which faces the rotor and is fixed to a housing. The rotor is formed by arranging magnets with equal intervals in a circumferential direction and by fixing them to a rotor core by, for example, insert molding. The stator is formed by arranging iron cores on which coils are wound with equal intervals in a circumferential direction and by fixing them to the housing by, for example, shrink fitting. A resolver 52 detecting the motor rotation angle is provided on the reaction force motor 51.

A steering angle sensor 53 is provided on the steering shaft 12. According to the reaction force motor 51, when the reaction force motor 51 is driven in a state the clutch 19 is disconnect, a motor torque is transmitted to the steering shaft 12. Therefore, by controlling the driving of the reaction force motor 51 depending on the reaction force received from the road surface while the clutch 19 is disconnect to perform the steering-by-wire, a desired reaction force characteristics providing operation reaction force against steering operation by the driver are achieved.

Next, the configuration of the control system will be described. The present embodiment includes the first turning controller (turning ECU 1) 71, the second turning controller (turning ECU 2) 72, and a reaction force controller (reaction force ECU) 73. The respective controllers include microcomputers, for example.

The first turning controller 71 receives signals from the resolver 33, the torque sensor 34, and the steering angle sensor 53, and controls the driving of the first turning motor M1 via a driver circuit. The second turning controller 72 receives signals from the resolver 39 and the steering angle sensor 53, and controls the driving of the second turning motor M2 via a driver circuit. The reaction force controller 73 receives signals from the resolver 52 and the steering angle sensor 53, and controls the driving of the reaction force motor 51 via a driver circuit.

The resolver 33 detects the motor rotation angle $\theta m1$ of the first turning motor M1. The resolver 33 outputs a detection signal depending on the rotation angle of the rotor from the rotor coil when the excitation signal is input to the stator coil. The first turning controller 71 outputs the excitation signal to the stator coil and determines the motor rotation angle $\theta m1$ of the first turning motor M1 on the basis of amplitude modulation of the detection signal received from the rotor coil, by a signal processing circuit. It is to be noted that the first turning controller 71 treats a right turn as a positive value and treats a left turn as a negative value. Similarly, the motor rotation angle $\theta m2$ of the second turning motor M2 is detected by the second turning controller 72 via the resolver 39, and the rotation angle $\theta r$ of the reaction force motor 51 is detected by the reaction force controller 73 via the resolver 52.

The torque sensor 34 detects the torque Ts input to the first pinion shaft 18. The torque sensor 34 detects a twist angle of the torsion bar interposed between the input side and the output side of the first pinion shaft 18 with, for example, a Hall device, and outputs to the first turning controller 71 an electrical signal obtained by converting a change in magnetic flux density produced due to a relative angular displacement between a multi-pole magnet and a yoke. The first turning controller 71 determines a torque Ts on the basis of the input electrical signal. It is to be noted that the first turning controller 71 treats right steering by the driver as a positive value and treats left steering as a negative value.

The steering angle sensor 53 includes a rotary encoder, for example, and detects a steering angle θs of the steering shaft 12. The steering angle sensor 53 detects, while a disc-shape scale rotates with the steering shaft 12, a light passing through a slit of the scale with two phototransistors, and outputs to the respective controllers a pulse signal in association with the rotation of the steering shaft 12. The respective controllers determine the steering angle θs of the steering shaft 12 on the basis of the input pulse signal. It is to be noted that the respective controllers treat right steering as a positive value and treats left steering as a negative value.

It is to be noted that the controllers are connected to one another via a communication line 74 to be capable of communicating with one another. That is, a communication path adopting an on-vehicle communication network (on-vehicle LAN) standard, such as a CSMA/CA type multiplex communication (CAN: Controller Area Network), Flex Ray, or the like, is constructed. The respective controllers are connected to the clutch 19 via a communication line 75. The communication line 75 is a communication path for outputting a clutch control signal capable of switching the clutch 19 such that the clutch is connected or disconnected. The clutch control signal is a signal for disconnecting the clutch 19. When the respective controllers output the clutch control signal, the clutch 19 is disconnected. When any one of the controllers stops outputting the clutch control signal, the clutch 19 is connected.

Next, control modes will be described. There are a two-motor SBW mode (2M-SBW), a two-motor EPS mode (2M-EPS), a one-motor SBW mode (1M-SBW), a one-motor EPS mode (1M-EPS) and a manual steering mode (MS) in the present embodiment. In the two-motor SBW mode, the steering-by-wire control is performed by the two motors. In the two-motor EPS mode, the electric power steering control is performed by the two motors. Furthermore, in the one-motor SBW mode, the steering-by-wire control is performed only by the one motor. In the one-motor EPS mode, the electric power steering control is performed only by the one motor. Then, in the manual steering mode, all of the steering control stops.

(Two-Motor SBW Mode)

In the two-motor SBW mode, in a state where the clutch control signal is output to disconnect the clutch 19, the first turning controller 71 controls the driving of the first turning motor M1 and the second turning controller 72 controls the driving of the second turning motor M2, thereby the turning angle control is performed. That is, the first turning motor M1 and the second turning motor M2 cooperate so as to share and output needed turning force. On the other hand, the reaction force controller 73 controls the driving of the reaction force motor 51, and thereby performs the reaction force control. Thus, the desired steering characteristics as the steering-by-wire function are achieved and a good operation feeling is achieved.

The first turning controller 71 and the second turning controller 72 set a target turning angle θw* corresponding the steering angle θs and estimate an actual turning angle θw. Then, the first turning controller 71 and the second turning controller 72 receives the motor rotation angles θm1 and θm2 and control the driving of the first turning motor M1 and the second turning motor M2 such that the actual turning angle θw matches the target turning angle θw* by using, for example, a robust model matching method.

The target turning angle θw* is set depending on, for example, a vehicle speed V. That is, in stationary steering or low-speed traveling, the target turning angle θw* is set so as to obtain the large turning angle θw with the small steering angle θs in order to reduce the operation burden of the driver. Furthermore, in high-speed traveling, the target turning angle θw* is set so as to suppress the change in the turning angle θw corresponding to the change in the steering angle θs in order to suppress an excessively sensitive vehicle behavior to ensure traveling stability. The actual turning angle θw is estimated on the basis of the steering angle θs, the motor rotation angle θm1, the motor rotation angle θm2, and the like.

The reaction force controller 73 sets the target reaction force torque Tr* corresponding to the reaction force received from the road surface in the steering operation and controls the driving of the reaction force motor 51 such that the torque of the reaction force motor 51 matches the target reaction force torque Tr*. The target reaction force torque Tr* is set on the basis of, for example, the steering angle θs, a current Im1 flowing the first turning motor M1, a current Im2 flowing the second turning motor M2, and the like.

(Two-Motor EPS Mode)

In the two-motor EPS mode, in a state the output of the clutch control signal is stopped, and thus the clutch 19 is connected, the first turning controller 71 controls the driving of the first turning motor M1 and the second turning controller 72 controls the driving of the second turning motor M2, thereby the assist control is performed. Thus, the steering system is connected mechanically to ensure a direct steering operationality, and further, the operation burden of the driver is reduced by the electric power steering function. The first turning controller 71 and the second turning controller 72 set a target assist torque Ta* and control the driving of the first turning motor M1 and the second turning motor M2 such that the torque of the first turning motor M1 matches the target assist torque Ta*.

The target assist torque Ta* is set depending on, for example, the vehicle speed V. That is, in stationary steering or low-speed traveling, the target assist torque Ta* is set be larger in order to reduce the operation burden of the driver. Furthermore, in high-speed traveling, the target assist torque Ta* is set to be smaller in order to suppress the excessively sensitive vehicle behavior to ensure traveling stability. On the other hand, in the two-motor EPS mode, the relay circuit of the reaction force motor 51 is disconnected. This is to prevent the reaction force motor 51 itself from being driven as a load by the rotation of the steering shaft 12, when the driver performs the steering operation and when the first turning controller 71 controls the driving of the first turning motor M1 and the second turning controller 72 controls the driving of the second turning motor M2.

(One-Motor SBW Mode)

In one-motor SBW mode, in a state where the clutch control signal is output to disconnect the clutch 19 and the first turning controller 71 does not control the driving of the first turning motor M1 (non-driving), the second turning controller 72 controls the driving of the second turning motor M2 to perform the turning angle control. That is, the second turning motor M2 outputs the needed turning force alone. On the other hand, the reaction force controller 73 controls the driving of the reaction force motor 51 to perform the reaction force control. Thus, the desired steering characteristics as the steering-by-wire function are achieved and the good operation feeling is achieved.

The setting of the target turning angle θw*, the control method of the second turning motor M2, the setting of the target reaction torque Tr*, and the control method of the reaction force motor 51 are the same as those in the two-motor SBW mode. On the other hand, in the one-motor SBW mode, the relay circuit of the first turning motor M1 is disconnected, thereby the first turning motor M1 is disconnected from the electrical circuit. This is to prevent the first turning motor M1 itself from being driven as a load by the back-and-forth movement of the rack shaft 16, when the second turning controller 72 controls the driving of the second turning motor M2.

(One-Motor EPS Mode)

In one-motor EPS mode, in a state the output of the clutch control signal is stopped, and thus the clutch 19 is connected, and the second turning controller 72 does not control the driving of the second turning motor M2 (non-driving), the first turning controller 71 controls the driving of the first turning motor M1, thereby the assist control is performed. Thus, the steering system is connected mechanically to ensure the direct steering operationality, and further, the operation burden of the driver is reduced by the electric power steering function. The setting of the target assist torque Ta*, and the control method of the first turning motor M1 are the same as those in the two-motor EPS mode.

On the other hand, in one-motor EPS mode, the relay circuit of the second turning motor M2 is disconnected, thereby the second turning motor M2 is disconnected from the electrical circuit. This is to prevent the second turning motor M2 itself from being driven as a load by the back-and-forth movement of the rack shaft 16, when the driver performs the steering operation and when the first turning controller 71 controls the driving of the first turning motor M1. For the similar reason, the relay circuit of the reaction force motor 52 is disconnected, thereby the reaction force motor 52 is disconnected from the electrical circuit. This is to prevent the reaction force motor 52 itself from being driven as a load by the rotation of the steering shaft 12, when the driver performs the steering operation and when the first turning controller 71 controls the driving of the first turning motor M1.

(Manual Steering Mode)

In the manual steering mode, in a state the output of the clutch control signal is stopped, and thus the clutch 19 is connected, the first turning controller 71 does not control the driving of the first turning motor M1 (non-driving) and the second turning controller 72 does not control the driving of the second turning motor M2 (non-driving). That is, all of the steering control by the respective controllers is stopped. Thus, the steering system is connected mechanically to ensure the direct steering operationality.

In the manual steering mode, the relay circuits of the first turning motor M1 and the second turning motor M2 are disconnected, thereby the first turning motor M1 and the second turning motor M2 are disconnected from the electrical circuit. This is to prevent the first turning motor M1 and the second turning motor M2 themselves from being driven as loads by the back-and-forth movement of the rack shaft 16, when the driver performs the steering operation. For the similar reason, the relay circuit of the reaction force motor 52 is disconnected, thereby the reaction force motor 52 is disconnected from the electrical circuit. This is to prevent the reaction force motor 52 itself from being driven as a load by the rotation of the steering shaft 12, when the driver performs the steering operation.

Next, the fail-safe will be described. The respective controllers perform self-diagnoses as to whether or not their control systems malfunction, and switch the control mode depending on the diagnoses result. That is, the first turning controller 71 diagnose whether or not the first turning controller 71 itself, the first actuator A1 including the torque sensor 34, or the wiring system malfunctions. Furthermore, the second turning controller 72 diagnose whether or not the second turning controller 72 itself, the second actuator A2 without an torque sensor, or the wiring system malfunctions. Furthermore, the reaction force controller 73 diagnose whether or not the reaction force controller 73 itself, the reaction force motor 52, or the wiring system malfunctions.

Figure 2:
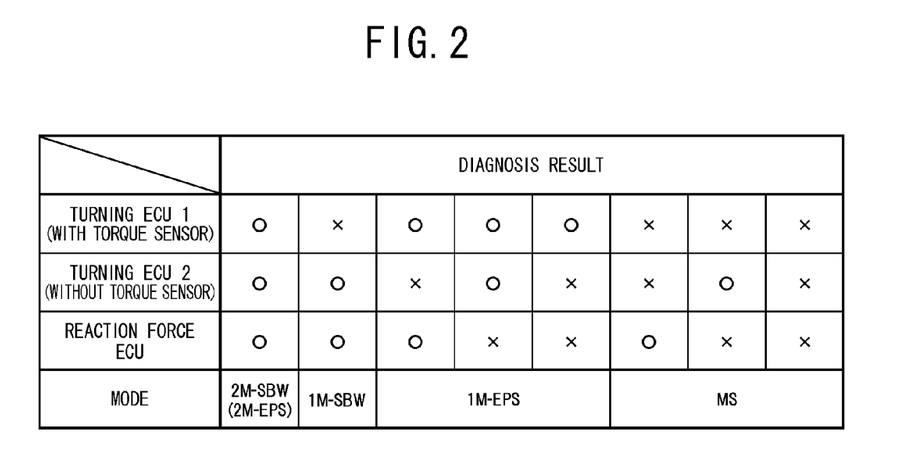
FIG. 2 is a view illustrating a control mode depending on a diagnosis result.

FIG. 2 is a view illustrating the control mode depending on the diagnosis result. Herein, the diagnosis result of each of the controller is described as "o" in a normal case where the malfunction is not detected, or as "x" in a case where the malfunction is detected. Firstly, when all of the control system of the first turning controller 71, the control system of the second turning controller 72, and the control system of the reaction force controller 73 are normal, the two-motor SBW mode is set. However, when a low voltage is applied to the first turning motor M1 and the second turning motor M2, when where the first turning motor M1 and the second turning motor M2 are overheated, when an ignition switch is turned on at starting (until the clutch 19 is disconnected), when the turning angle θw reaches at a maximum turning angle at end-abutting, or the like, the two-motor EPS mode is set as a temporary measure.

On the other hand, when at least one of the control system of the first turning controller 71, the control system of the second turning controller 72, and the control system of the reaction force controller 73 malfunctions, the control mode is switched to any one of the one-motor SBW mode, the one-motor EPS mode and the manual steering mode.

Firstly, it is assumed that the control system of the second turning controller 72 and the control system of the reaction force controller 73 are normal, and the control system of the first turning controller 71 malfunctions. In this case, the one-motor SBW mode is set, since just the steering-by-wire function and the electric power steering function by the first actuator A1 malfunctions and the steering-by-wire function by the second actuator A2 and a reaction force generation function by the reaction force motor 52 are maintained.

Furthermore, it is assumed that the control system of the first turning controller 71 and the control system of the reaction force controller 73 are normal, and the control system of the second turning controller 72 malfunctions. In this case, the one-motor EPS mode is set, since just the steering-by-wire function by the second actuator A2 malfunctions and the electric power steering function by the first actuator A1 is maintained.

Furthermore, it is assumed that the control system of the first turning controller 71 and the control system of the second turning controller 72 are normal, and the control system of the reaction force controller 73 malfunctions. In this case, the one-motor EPS mode is set, since just the reaction force generation function by the reaction force motor 52 malfunctions and the electric power steering function by the first actuator A1 is maintained.

Furthermore, it is assumed that the control system of the first turning controller 71 is normal, and the control system of the second turning controller 72 and the control system of the reaction force controller 73 malfunction. In this case, the one-motor EPS mode is set, since just the steering-by-wire function by the second actuator A2 and the reaction force generation function by the reaction force motor 52 malfunction, and the electric power steering function by the first actuator A1 is maintained.

Furthermore, it is assumed that the control system of the reaction force controller 73 is normal, and the control system of the first turning controller 71 and the control system of the second turning controller 72 malfunction. In this case, the manual steering mode is set, since the steering-by-wire function and the electric power steering function by the first actuator A1 and the steering-by-wire function by the second actuator A2 malfunction, although the reaction force generation function by the reaction force motor 52 is maintained.

Furthermore, it is assumed that the control system of the second turning controller 72 is normal, and the control system of the first turning controller 71 and the control system of the reaction force controller 73 malfunction. In this case, the manual steering mode is set, since the steering-by-wire function or the electric power steering function by the first actuator A1 and the reaction force generation function by the reaction force motor 52 malfunction, although the steering-by-wire function by the second actuator A2 is maintained.

Then, it is assumed that all of the control system of the first turning controller 71, the control system of the second turning controller 72, and the control system of the reaction force controller 73 malfunction. In this case, the manual steering mode is set, since all of the steering-by-wire function and the electric power steering function by the first actuator A1, the steering-by-wire function by the second actuator A2, and the reaction force generation function by the reaction force motor 52 malfunction.

Figure 3:
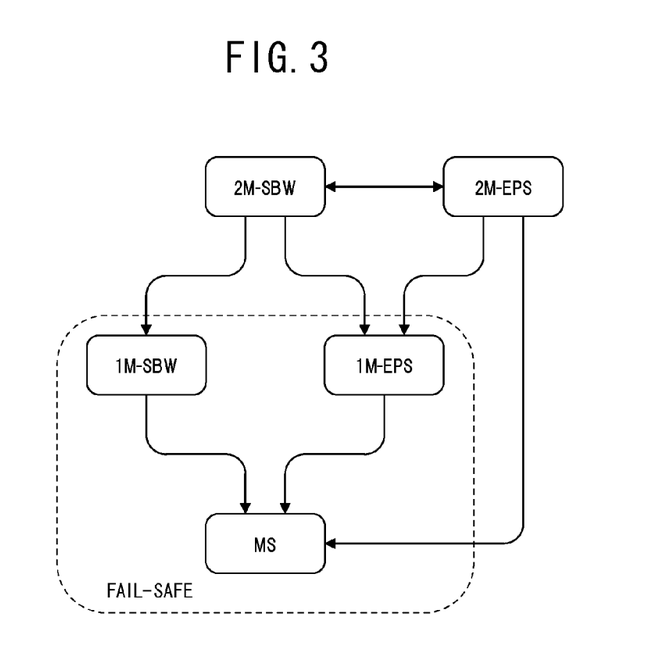
FIG. 3 is a transition diagram of a control mode.

Next, a transition of the control mode will be described. FIG. 3 is a transition diagram of the control mode. Firstly, when all of the control system of the first turning controller 71, the control system of the second turning controller 72, and the control system of the reaction force controller 73 are normal, the two-motor SBW mode is set basically. Additionally, when a low voltage is applied to the first turning motor M1 and the second turning motor M2, when the first turning motor M1 and the second turning motor M2 are overheated, when an ignition switch is turned on at starting (until the clutch 19 is disconnected), when the turning angle θw reaches at a maximum turning angle at end-abutting, or the like, the two-motor EPS mode is set as the temporary measure. Then, when the state where a low voltage is applied to the first turning motor M1 and the second turning motor M2 or where the first turning motor M1 and the second turning motor M2 are over heated is eliminated, when the clutch 19 is disconnected, or the turning angle θ decreases, the two-motor SBW mode is set. In this way, as long as all of the control system of the first turning controller 71, the control system of the second turning controller 72, and the control system of the reaction force controller 73 function normally, the control mode transits between the two-motor SBW mode and the two-motor EPS mode.

Furthermore, when the malfunction of the control system of the first turning controller 71 is caused as the primary failure in the state of the two-motor SBW mode, the control mode transits into the one-motor SBW mode. Then, when the malfunction of at least one of the control system of the second turning controller 72 or the control system of the reaction force controller 73 is caused as the secondary failure in the state of the one-motor SBW mode, the control mode transits into the manual steering mode. In this way, the control mode does not directly transit from the two-motor SBW mode into the manual steering mode without via the one-motor SBW mode. The transition of the control mode is redundant such that the control mode transits step by step depending on the failure level.

Furthermore, when the malfunction of at least one of the control system of the second turning controller 72 and the control system of the reaction force controller 73 is caused as the primary failure in the state of the two-motor SBW mode, the control mode transits into the one-motor EPS mode. Then, when the malfunction of the control system of the first turning controller 71 is caused as the secondary failure in the state of the one-motor EPS mode, the control mode transits into the manual steering mode. In this way, the control mode does not directly transit from the two-motor SBW mode into the manual steering mode without via the one-motor EPS mode. The transition of the control mode is redundant such that the control mode transits step by step depending on the failure level.

Furthermore, when the malfunction of at least one of the control system of the second turning controller 72 and the control system of the reaction force controller 73 is caused as the primary failure in the state of the two-motor EPS mode as the temporary measure, the control mode transits into the one-motor EPS mode. Then, when the malfunction of the control system of the first turning controller 71 is caused as the secondary failure in the state of the one-motor EPS mode, the control mode transits into the manual steering mode. In this way, the control mode does not directly transit from the two-motor EPS mode into the manual steering mode without via the one-motor EPS mode. The transition of the control mode is redundant such that the control mode transits step by step depending on the failure level.

It is to be noted that when the malfunction of the control system of the first turning controller 71 is caused in the state of the two-motor EPS mode as the temporary measure, the control mode directly transits into the manual steering mode, since the transition into the one-motor EPS mode is not possible.

(Operation)

Next, the operation of the first embodiment will be described. In the present embodiment, there is provided the first turning motor M1 and the second turning motor M2 capable of providing the driving force to the turning output mechanism $St_{OUT}$ to perform the two-motor SBW mode in which the wheels 13L and 13R are turned by these two motor. Thus, the desired steering characteristics as the steering-by-wire function are achieved. Furthermore, by adopting the configuration in which the wheels 13L and 13R are turned by the two motor, it is possible to share the needed driving force for the turning output mechanism $St_{OUT}$. Therefore, it is possible to suppress the increasing in the size of the motor and is excellent in the layout characteristics in comparison with a configuration in which the wheels 13L and 13R are turned by one motor.

Furthermore, in the configuration in which the wheels 13L and 13R are turned by the two motor, even if any one of the control systems malfunctions, it is possible to utilize the other control system which does not malfunction. In the present embodiment, there is provided the two control mode including the one-motor SBW mode and the one-motor EPS mode as the fail-safe for the primary failure in which only any one of the control systems malfunctions.

Firstly, it is assumed that the control system of the second turning controller 72 and the control system of the reaction force controller 73 are normal, and the control system of the first turning controller 71 malfunctions. In this case, the one-motor SBW mode is set, since just the steering-by-wire function and the electric power steering function by the first actuator A1 malfunctions and the steering-by-wire function by the second actuator A2 and the reaction force generation function by the reaction force motor 52 are maintained. Thus, since the steering-by-wire function is maintained, it is possible to achieve the desired steering characteristics and the good operation feeling.

Furthermore, it is assumed that the control system of the first turning controller 71 and the control system of the reaction force controller 73 are normal, and the control system of the second turning controller 72 malfunctions. In this case, the one-motor EPS mode is set, since just the steering-by-wire function by the second actuator A2 malfunctions and the electric power steering function by the first actuator A1 is maintained. Thus, the steering system is connected mechanically to ensure the direct steering operationality, and further, the operation burden of the driver is reduced by the electric power steering function.

As mentioned above, when the primary failure is caused in the state where the two-motor SBW mode is performed, it is determined depending on the malfunction occurrence point, whether the control mode transits into the one-motor SBW mode, or into the one-motor EPS mode. The Point to be considered in distinguishing is whether or not there is an interface to the torque sensor 34, that is, whether or not it is possible to obtain the detected value of the torque sensor 34. Therefore, when the control system of the first turning controller 71 does not malfunction, the control mode is switched to the one-motor EPS mode.

It is to be noted that although it is possible to control the driving of the first turning motor M1 by the second turning controller 72 to perform the one-motor SBW mode by the first turning motor M1, the one-motor EPS mode is adopted in consideration of the burden on the first turning motor M1. One motor is designed so as to output the needed turning force alone. However, there is a need to downsize the motor as much as possible. Thus, a sufficient margin as motor performance is not always ensured. Therefore, the one-motor EPS mode performing the electric power steering control by one motor is actively utilized rather than the one-motor SBW mode performing the steering-by-wire control by one motor.

Furthermore, not only the first turning motor M1, but also the second turning motor M2 could perform the one-motor EPS mode by providing the torque sensor on the second turning motor M2. However, this results in cost increase. Therefore, the interfaces to the torque sensors are not constructed in the two systems. Instead, it is preferable to assign the different roles which are for EPS and for non-EPS (for SBW) to the first turning motor M1 and the second turning motor M2, respectively, as the present embodiment, since it is cost-effective.

As mentioned above, when the primary failure is caused in the state where the two-motor SBW mode is performed, the control mode is switched to any of the one-motor SBW mode or the one-motor EPS mode depending on the malfunction occurrence point. In this way, even when any one of the control systems malfunctions, the other control system which does not malfunction is utilized. Thus, it is possible to achieve a fail-safe fully utilizing the advantage of the provision of the two motors.

On the other hand, it is provided a fail-safe against the secondary failure, in which the other control system malfunctions despite the fail-safe against the primary failure. This is the manual steering mode, in which all of the steering control by the respective controllers stops in a state where the outputs of the clutch control signals are stopped and the clutch 19 is connected. Thus, the steering system is connected mechanically to ensure the direct steering operationality.

For example, when the control system of the second turning controller 72 or the control system of the reaction force controller 73 malfunctions in a state where the one-motor SBW mode is performed due to the malfunction of the control system of the first turning controller 71 as the primary failure, the control mode is switched to the manual steering mode.

Furthermore, when the control system of the first turning controller 71 malfunctions in a state where the one-motor EPS mode is performed due to the malfunction of the control system of the second turning controller 72 as the primary failure, the control mode is also switched to the manual steering mode.

As mentioned above, when the secondary failure is caused in the state where the one-motor SBW mode or the one-motor EPS mode is performed, the control mode is switched to the manual steering mode.

In this way, the control mode is switched from the two-motor SBW mode to the one-motor SBW mode or the one-motor EPS mode due to the primary failure, and further switched to the manual steering mode ultimately due to the secondary failure. That is, the control mode does not directly transit from the two-motor SBW mode into the manual steering mode without via the one-motor SBW mode or the one-motor EPS mode. The transition of the control mode is redundant such that the control mode transits step by step depending on the failure level. Therefore, it is possible to construct a control system giving no uncomfortable feeling to the driver.

(Modification)

In the present embodiment, there is provided the two motors including the first turning motor M1 and the second turning motor M2 as the motors providing the driving force to the turning output mechanism $St_{OUT}$. The present disclosure is not limited thereto, and may include three or more motors. In this way, by increasing the number of the motors for providing the driving force to the turning output mechanism $St_{OUT}$, it is possible to reduce the driving force required for one motor to downsize the one motor.

In the present embodiment, the first turning motor M1 is coupled to the first pinion shaft 18 via the worm gear 32, the present disclosure is not limited thereto. That is, only provision of the driving force to the turning output mechanism $St_{OUT}$ is required. Therefore, the direct drive configuration in which the worm gear 32 is omitted may be adapted by, for example, constructing the first turning motor M1 including a rotor rotating with the first pinion shaft and a stator for the rotor, which is fixed on the housing. Furthermore, the second turning motor M2 is coupled to the second pinion shaft 36 via the worm gear 38. However, a direct drive configuration in which the worm gear 38 is omitted may be adapted. In this way, by omitting the first pinion shaft 18 or the second pinion shaft 36, it is possible to suppress weight increase and to reduce the number of components.

The present embodiment adopts a two-pinion configuration in which the rack shaft 16 is coupled to the first pinion shaft 18 via the pinion gear 17 and to the second pinion shaft 36 via the pinion gear 35. However, the present disclosure is not limited thereto. That is, only provision of the driving force to the turning output mechanism $St_{OUT}$ is required. Therefore, a one-pinion configuration may be adopted, in which the pinion gear 35 and the second pinion shaft 36 are omitted and the second turning motor M2 is coupled to the first pinion shaft 18 via the worm gear 38. In this way, by omitting the pinion gear 35 or the second pinion shaft 36, it is possible to suppress weight increase and to reduce the number of components.

In the present embodiment, the first turning motor M1 and the second turning motor M2 are configured of the same types of motors. However, the present disclosure is not limited thereto. When the primary failure is caused, for example, the first turning motor M1 is used in the one-motor EPS mode, whereas the second turning motor M2 is used in the one-motor SBW mode. As described above, the burden on the motor used in the one-motor SBW mode is larger than the burden on the motor used in the one-motor EPS mode. Therefore, the second turning motor M2 may be configured of a higher power motor than the power of the first turning motor M1. Thus, when the one-motor SBW mode is performed due to the malfunction caused in the control system of the first turning controller 71, it is possible to generate sufficient turning force only by the second turning motor M2.

In the present embodiment, when the first turning controller 71 malfunctions in a state where the two-motor SBW mode is performed, the one-motor EPS mode is abandoned and the one-motor SBW mode is performed. However, the present disclosure is not limited thereto. That is, when torque sensor 34 itself does not malfunction and it is possible to transmit the detected value of the torque sensor 34 from the first turning controller 71 to the second turning controller 72 via the communication line 74, the one-motor EPS mode may be performed by controlling of the driving of the second turning motor M2 with the second turning controller 72. In this way, by performing the one-motor EPS mode by the second turning controller 72 which obtains the detected value of the torque sensor 34, it is possible to reduce the burden on the second turning motor M2 in comparison with the case when performing the one-motor SBW mode. Therefore, it is possible to achieve lifetime improvement of the second turning motor M2.

In the above description, the steering shaft 12 corresponds to an "input shaft", the first pinion shaft 18 corresponds to an "output shaft", the first turning motor M1 corresponds to the "first motor", and the second turning motor M2 corresponds to the "second motor". Furthermore, the first turning controller 71 corresponds to the "first control unit", the second turning controller 72 corresponds to the "second control unit", the torque sensor 34 corresponds to a "torque detection unit", and the reaction force controller 73 corresponds to a "reaction force control unit". Furthermore, the two-motor SBW mode corresponds to a "two-motor turning control", the one-motor SBW mode corresponds to a "one-motor turning control", and the one-motor EPS mode corresponds to a "one-motor assist control".

(Effects)

Next, the effects of the main portion of the first embodiment will be described.

(1) The steering control device according to the present embodiment includes the steering input mechanism $St_{IN}$ in which the steering shaft 12 is rotated by the steering operation by the driver and the turning output mechanism $St_{OUT}$ configured to turn the wheels 13L and 13R by the rotation of the first pinion shaft 18. Furthermore, the steering control device includes the clutch 19 configured to couple the steering shaft 12 and the first pinion shaft 18 such that they are couplable and decouplable, the first turning motor M1 capable of providing the driving force to the turning output mechanism $St_{OUT}$, and the second turning motor M2 capable of providing the driving force to the turning output mechanism $St_{OUT}$. Furthermore, the steering control device includes the first turning controller 71 configured to control the driving of the first turning motor M1, the second turning controller 72 configured to control the driving of the second turning motor M2, and the torque sensor 34 configured to detect the torque of the first pinion shaft 18. Then, the two-motor SBW mode is defined as performing the control of the turning angle of the wheels 13L and 13R by controlling the rotation angle of the first turning motor M1 by the first turning controller 71 and by controlling the rotation angle of the second turning motor M2 by the second turning controller 72, depending on the rotation angle of the steering shaft 12 in the state where the clutch 19 is disconnected.

Furthermore, the one-motor SBW mode is defined as performing the control of the turning angle of the wheels 13L and 13R by controlling the rotation angle of the second turning motor M2 by the second turning controller 72, depending on the rotation angle of the steering shaft 12 in the state where the clutch 19 is disconnected and the first turning controller 71 does not control the driving of the first turning motor M1. Furthermore, the one-motor EPS mode is defined as performing the control of the assist torque for the steering operation by the driver by controlling the torque of the first turning motor M1 by the first turning controller 71 depending on the torque detected by the torque sensor 34 in the state where the clutch 19 is connected and the second turning controller 72 does not control the driving of the second turning motor M2. Then, when at least one of the first turning controller 71, the first turning motor M1, and the torque sensor 34 malfunctions in the state where the first turning controller 71 and the second turning controller 72 perform the two-motor SBW mode, the second turning controller 72 performs the one-motor SBW mode. Furthermore, when at least one of the second turning controller 72 and the second turning motor M2 malfunctions in the state where the first turning controller 71 and the second turning controller 72 perform the two-motor SBW mode, the first turning controller 71 performs the one-motor EPS mode. In this way, by switching the control depending on the malfunction occurrence point while utilizing the control system functioning normally, it is possible to achieve a fail-safe fully utilizing the advantage of the provision of plural motors.

(2) The steering control device according to the present embodiment includes the reaction force motor 51 capable of providing the steering reaction force to the steering input mechanism $St_{IN}$ and the reaction force controller 73 configured to control the driving of the reaction force motor 51. Then, the two-motor SBW mode is defined as performing the control of the turning angle of the wheels 13L and 13R by controlling the rotation angle of the first turning motor M1 by the first turning controller 71 and by controlling the rotation angle of the second turning motor M2 by the second turning controller 72, depending on the rotation angle of the steering shaft 12, and the control of the steering reaction force against the steering operation by the driver by controlling the torque of the reaction force motor 51 by the reaction force controller 73, in the state where the clutch 19 is disconnected. Furthermore, the one-motor SBW mode is defined as performing the control of the turning angle of the wheels 13L and 13R by controlling the rotation angle of the second turning motor M2 by the second turning controller 72, depending on the rotation angle of the steering shaft 12, and the control of the steering reaction force against the steering operation by the driver by controlling the torque of the reaction force motor 51 by the reaction force controller 73, in the state where the clutch 19 is disconnected and the first turning controller 71 does not control the driving of the first turning motor M1. Furthermore, the one-motor EPS mode is defined as performing the control of the assist torque for the steering operation by the driver by controlling the torque of the first turning motor M1 by the first turning controller 71 depending on the torque detected by the torque sensor 34, in the state where the clutch 19 is connected and the second turning controller 72 does not control the driving of the second turning motor M2. Then, when at least one of the first turning controller 71, the first turning motor M1, and the torque sensor 34 malfunctions in the state where the first turning controller 71, the second turning controller 72, and the reaction force controller 73 perform the two-motor SBW mode, the second turning controller 72 and the reaction force controller 73 perform the one-motor SBW mode. Furthermore, when at least one of the second turning controller 72 and the second turning motor M2 or at least one of the reaction force controller 73 and the reaction force motor 51 malfunctions in the state where the first turning controller 71, the second turning controller 72, and the reaction force controller 73 perform the two-motor SBW mode, the first turning controller 71 performs the one-motor EPS mode.

In this way, by switching the control depending on the malfunction occurrence point while utilizing the control system functioning normally, it is possible to achieve a fail-safe fully utilizing the advantage of the provision of plural motors.

(3) In the steering control device according to the present embodiment, the one-motor SBW mode is suspended in a state where the clutch 19 is connected, when at least one of the second turning controller 72 and the second turning motor M2 or at least one of the reaction force controller 73 and the reaction force motor 51 malfunctions in a state where the one-motor SBW mode is performed. Thus, the steering system is connected mechanically to ensure the direct steering operationality.

(4) In the steering control device according to the present embodiment, the one-motor EPS mode is suspended in a state where the clutch 19 is connected, when at least one of the first turning controller 71, the first turning motor M1, and the torque sensor 34 malfunctions in a state where the one-motor EPS mode is performed. Thus, the steering system is connected mechanically to ensure the direct steering operationality.

(5) In the steering control device according to the present embodiment, at least the first turning motor M1 and the torque sensor 34 are configured as an integrated composite component and are used in common as components of the electric power steering apparatus. Thus, it is possible to share the existing components of the electric power steering apparatus, for example, and it is possible to suppress cost increase.

(6) The steering control device according to the present embodiment, the first turning motor M1 and the second turning motor M2 are configured of the same types of motors. Thus, it is possible to commonalize the motors to suppress cost increase.

(7) The steering control device according to the present embodiment, the second turning motor M2 is configured of a higher power motor than the power of the first turning motor M1. Thus, when the one-motor SBW mode is performed, it is possible to generate sufficient turning force only by the second turning motor M2.

(8) The steering control method according to the present embodiment includes coupling the steering shaft 12 and the first pinion shaft 18 by the clutch 19 such that the steering shaft 12 and the first pinion shaft 18 are couplable and decouplable, the clutch 19 being provided between the steering input mechanism $St_{IN}$ in which the steering shaft 12 is rotated by the steering operation by the driver and the turning output mechanism $St_{OUT}$ configured to turn the wheels 13L and 13R by the rotation of the first pinion shaft 18. Furthermore, the steering control method includes providing the driving force to the turning output mechanism $St_{OUT}$ by the first turning motor M1 and the second turning motor M2, controlling the driving of the first turning motor M1 by the first turning controller 71, controlling the driving of the second turning motor M2 by the second turning controller 72, and detecting the torque of the first pinion shaft 18 by the torque sensor 34. Then, the two-motor SBW mode is defined as performing the control of the turning angle of the wheels 13L and 13R by controlling the rotation angle of the first turning motor M1 by the first turning controller 71 and by controlling the rotation angle of the second turning motor M2 by the second turning controller 72, depending on the rotation angle of the steering shaft 12 in the state where the clutch 19 is disconnected. Furthermore, the one-motor SBW mode is defined as performing the control of the turning angle of the wheels 13L and 13R by controlling the rotation angle of the second turning motor M2 by the second turning controller 72, depending on the rotation angle of the steering shaft 12 in the state where the clutch 19 is disconnected and the first turning controller 71 does not control the driving of the first turning motor M1. Furthermore, the one-motor EPS mode is defined as performing the control of the assist torque for the steering operation by the driver by controlling the torque of the first turning motor M1 by the first turning controller 71 depending on the torque detected by the torque sensor 34 in the state where the clutch 19 is connected and the second turning controller 72 does not control the driving of the second turning motor M2. Then, the one-motor SBW mode is performed by the second turning controller 72, when at least one of the first turning controller 71, the first turning motor M1, and the torque sensor 34 malfunctions in the state where the first turning controller 71 and the second turning controller 72 perform the two-motor SBW mode. Furthermore, the one-motor EPS mode is performed by the first turning controller 71 when at least one of the second turning controller 72 and the second turning motor M2 malfunctions in the state where the first turning controller 71 and the second turning controller 72 perform the two-motor SBW mode.

In this way, by switching the control depending on the malfunction occurrence point while utilizing the control system functioning normally, it is possible to achieve a fail-safe fully utilizing the advantage of the provision of plural motors.

While the present invention has been described with reference to the definite number of embodiments, the scope of the present invention is not limited thereto and modifications of the embodiments based on the above disclosure are obvious to those skilled in the art.

The invention claimed is:
1. A steering control device comprising:
an input shaft configured to be rotated by a steering operation by a driver;
an output shaft, a rotation of the output shaft turning a wheel;
a clutch configured to couple the input shaft and the output shaft such that the input shaft and the output shaft are couplable and decouplable;
a first motor capable of providing driving force to the output shaft;

a second motor capable of providing driving force to the output shaft;

a first computer configured to control driving of the first motor;

a second computer configured to control driving of the second motor; and a torque sensor configured to detect a torque of the output shaft, wherein at least the first motor and the torque sensor are configured as an integrated composite component, the second computer is configured to perform a one-motor turning control mode when at least one of the first computer, the first motor, and the torque sensor malfunctions, in a state where the first computer and the second computer perform a two-motor turning control mode, and the first computer is configured to perform a one-motor assist control mode- by directly shifting from the two-motor turning control mode to the one-motor assist control mode, when at least one of the second computer and the second motor malfunctions, in the state where the first computer and the second computer perform the two-motor turning control mode, and wherein the clutch is disconnected and rotation angles of the first motor and the second motor are controlled by the first computer and the second computer depending on a rotation angle of the input shaft in the two-motor turning control mode, the clutch is connected and a torque of the first motor is controlled by the first computer depending on the torque of the output shaft that is available to the first computer and not available to the second computer and detected by the torque sensor in the one-motor assist control mode, and the clutch is disconnected and the rotation angle of the second motor is controlled by the second computer depending on the rotation angle of the input shaft in the one-motor turning control mode.

2. The steering control device according to claim 1, further comprising;

a reaction force motor capable of providing steering reaction force to the input shaft; and a third computer configured to control driving of the reaction force motor, wherein the second computer and the third computer are configured to perform the one-motor turning control mode when at least one of the first computer, the first motor, and the torque sensor malfunctions, in a state where the first computer, the second computer, and the third computer perform the two-motor turning control mode, and the first computer is configured to perform the one-motor assist control mode even in the state the one-motor turning control mode can be performed, when at least one of the second computer and the second motor, or at least one of the third computer and the reaction force motor malfunctions in the state where the first computer, the second computer, and the third computer perform the two-motor turning control mode, and wherein the clutch is disconnected, the rotation angles of the first motor and the second motor are controlled by the first computer and the second computer depending on the rotation angle of the input shaft, and a torque of the reaction force motor is controlled by the third computer, in the two-motor turning control mode, the clutch is connected and the torque of the first motor is controlled by the first computer depending on the torque detected by the torque sensor in the one-motor assist control mode, and the clutch is disconnected, the rotation angle of the second motor is controlled by the second computer depending on the rotation angle of the input shaft, and the torque of the reaction force motor is controlled by the -third computer, in the one-motor turning control mode.

3. The steering control device according to claim 2, configured to suspend the one-motor turning control mode in a state where the clutch is connected, when at least one of the second computer and the second motor, or at least one of the third computer and the reaction force motor malfunctions in a state where the one-motor turning control mode is performed.

4. The steering control device according to claim 1, configured to suspend the one-motor assist control mode in a state where the clutch is connected, when at least one of the first computer, the first motor, and the torque sensor malfunctions in a state where the one-motor assist control mode is performed.

5. The steering control device according to claim 1, wherein at least the first motor and the torque sensor are used in common as components of an electric power steering apparatus.

6. The steering control device according to claim 1, wherein the first motor and the second motor are configured of same types of motors.

7. The steering control device according to claim 1, wherein the second motor is configured of a higher power motor than a power of the first motor.

8. A steering control method comprising:

coupling an input shaft and an output shaft by a clutch provided between a steering input mechanism in which the input shaft is rotated by a steering operation by a driver and a turning output mechanism configured to turn a wheel by a rotation of the output shaft, such that the input shaft and the output shaft are couplable and decouplable;

providing driving force to the turning output mechanism by a first motor and a second motor;

controlling driving of the first motor by a first control unit;

controlling driving of the second motor by a second control unit;

detecting a torque of the output shaft by a torque detection unit;

performing a one-motor turning control mode by the second control unit when at least one of the first control unit, the first motor, and the torque detection unit malfunctions, in a state where the first control unit and the second control unit perform a two-motor turning control mode; and performing a one-motor assist control mode by the first control unit by directly shifting from the two-motor turning control mode to the one-motor assist control mode, when at least one of the second control unit and the second motor malfunctions, in the state where the first control unit and the second control unit perform the two-motor turning control mode, wherein at least the first motor and the torque detection unit are configured as an integrated composite component, the clutch is disconnected and rotation angles of the first motor and the second motor are controlled by the first control unit and the second control unit depending on a rotation angle of the input shaft in the two-motor turning control mode, the clutch is connected and a torque of the first motor is controlled by the first control unit depending on the torque of the output shaft that is available to the first control unit and not available to the second control unit and detected by the torque detection unit in the one-motor assist control mode, and the clutch is disconnected and the rotation angle of the second motor is controlled by the second control unit depending on the rotation angle of the input shaft in the one-motor turning control mode.

9. A steering control device comprising:

an input shaft configured to be rotated by a steering operation by a driver;

an output shaft, a rotation of the output shaft turning a wheel;

a clutch configured to couple the input shaft and the output shaft such that the input shaft and the output shaft are couplable and decouplable;

a first motor capable of providing driving force to the output shaft;

a second motor capable of providing driving force to the output shaft;

a first computer configured to control driving of the first motor;

a second computer configured to control driving of the second motor; and a torque sensor configured to detect a torque of the output shaft, wherein the second computer is configured to perform a one-motor turning control mode when at least one of the first computer, the first motor, and the torque sensor malfunctions, in a state where the first computer and the second computer perform a two-motor turning control mode, and the first computer is configured to perform a one-motor assist control mode by directly shifting from the two-motor turning control mode to the one-motor assist control mode, when at least one of the second computer and the second motor malfunctions in the state where the first computer and the second computer perform the two-motor turning control mode, and wherein the clutch is disconnected and rotation angles of the first motor and the second motor are controlled by the first computer and the second computer depending on a rotation angle of the input shaft in the two-motor turning control mode, the clutch is connected and a torque of the first motor is controlled by the first computer depending on the torque of the output shaft that is available to the first computer and not available to the second computer and detected by the torque sensor in the one-motor assist control mode, and the clutch is disconnected and the rotation angle of the second motor is controlled by the second computer depending on the rotation angle of the input shaft in the one-motor turning control mode.

10. A steering control device comprising:

a steering input mechanism in which an input shaft is rotated by a steering operation by a driver;

a turning output means for turning a wheel by a rotation of an output shaft;

a coupling means for coupling the input shaft and the output shaft such that the input shaft and the output shaft are couplable and decouplable;

a first motor for providing driving force to the turning output means;

a second motor for providing driving force to the turning output means;

a first control means for controlling driving of the first motor;

a second control means for controlling driving of the second motor; and a torque detection means for detecting a torque of the output shaft, wherein the second control means is configured to perform a one-motor turning control mode when at least one of the first control means, the first motor, and the torque detection means malfunctions, in a state where the first control means and the second control means perform a two-motor turning control mode, and the first control means is configured to perform a one-motor assist control mode by directly shifting from the two-motor turning control mode to the one-motor assist control mode, when at least one of the second control means and the second motor malfunctions in the state where the first control means and the second control means perform the two-motor turning control mode, and wherein the input shaft and the output shaft is decoupled and rotation angles of the first motor and the second motor are controlled by the first control means and the second control means depending on a rotation angle of the input shaft in the two-motor turning control mode, the input shaft and the output shaft is coupled and a torque of the first motor is controlled by the first control means depending on the torque of the output shaft that is available to the first control means and not available to the second control means and detected by the torque detection means in the one-motor assist control mode, and the input shaft and the output shaft is decoupled and the rotation angle of the second motor is controlled by the second control means depending on the rotation angle of the input shaft in the one-motor turning control mode.

* * * * *